Sept. 15, 1959 O. S. WHITE 2,903,741

TIRE VULCANIZING EQUIPMENT

Filed Feb. 20, 1956 4 Sheets-Sheet 1

INVENTOR
O. S. WHITE

BY A. Yates Dowell
ATTORNEY

Sept. 15, 1959 O. S. WHITE 2,903,741

TIRE VULCANIZING EQUIPMENT

Filed Feb. 20, 1956 4 Sheets-Sheet 2

INVENTOR
O. S. WHITE

BY

ATTORNEY

Sept. 15, 1959 O. S. WHITE 2,903,741

TIRE VULCANIZING EQUIPMENT

Filed Feb. 20, 1956 4 Sheets-Sheet 3

INVENTOR
O. S. WHITE

BY A. Yates Dowell
ATTORNEY

INVENTOR
O. S. WHITE
BY A. Yates Dowell
ATTORNEY 2,903,741

TIRE VULCANIZING EQUIPMENT

Ottis S. White, Florence, Ala.

Application February 20, 1956, Serial No. 566,659
4 Claims. (Cl. 18—18)

This invention relates to rubber and other substances of a generally similar nature and to articles manufactured therefrom including pneumatic tires employed on automobiles and other vehicles and to the recapping, retreading or repair of such tires by the application of heat and pressure.

The invention relates particularly to the treatment of pneumatic tires of the so-called tubeless variety in which the rim forms part of the structure in which the air is retained, and in which the amount of rubber is considerably less than in pneumatic tires of the character in which the tube is employed within the outer casing.

This application is a continuation-in-part of my application, Serial No. 498,956, filed April 5, 1955, now Patent No. 2,871,514, issued February 3, 1959.

The invention is concerned with equipment employed in the vulcanization of pneumatic tires including the molds employed, the manner of externally and internally supporting the tires during vulcanization, and with means for selectively applying heat to the proper areas to be vulcanized without the supplying of excessive heat causing damage to other portions of the tires.

Heretofore, equipment employed in recapping, retreading and repairing pneumatic tires has been subject to criticism an account of the amount of time required to perform the necessary operations as well as the difficulty in applying heat in the desired locations and the large amount of equipment required. Also, it has been necessary to employ air or sand bags within the tires to prevent collapsing of the latter and such bags have required replacement.

It is an object of the invention to overcome the disadvantages above enumerated and to provide relatively simple vulcanizing equipment for use on motor vehicle tires of all kinds including both light and heavy duty, and of the character employed with or without inner tubes, as well as equipment in which heat can be selectively applied over any desired inner or outer surface area without the application of excess heat to other areas or without the use of filler members or air or sand bags on the interior of the tire.

Another object of the invention is to provide equipment of the above character by means of which considerably less time is required in performing the necessary vulcanizing operations, by which a conventional mold may be employed, and by which a single mold may be used for tires of different sizes.

Another object of the invention is to provide selective and independent means for applying heat in a number of different ways, and to provide means for draining away moisture, condensed or otherwise, present in the tube.

A further object of the invention is to provide tire recapping equipment in which the necessary heat can be applied internally as well as externally of the tire casing and in which steam may be applied in direct contact with the tire casing without causing any deleterious effects to the tire.

Still another object is to provide equipment for vulcanizing tires, without requiring the use of separate air or sand bags, and which is especially constructed to retain air or steam without loss through leakage.

Further objects and advantages of the invention will be apparent from the following description taken in conjunction with the accompanying drawings, wherein.

Figures 1, 3, 4, 5, 6, 11, 12:
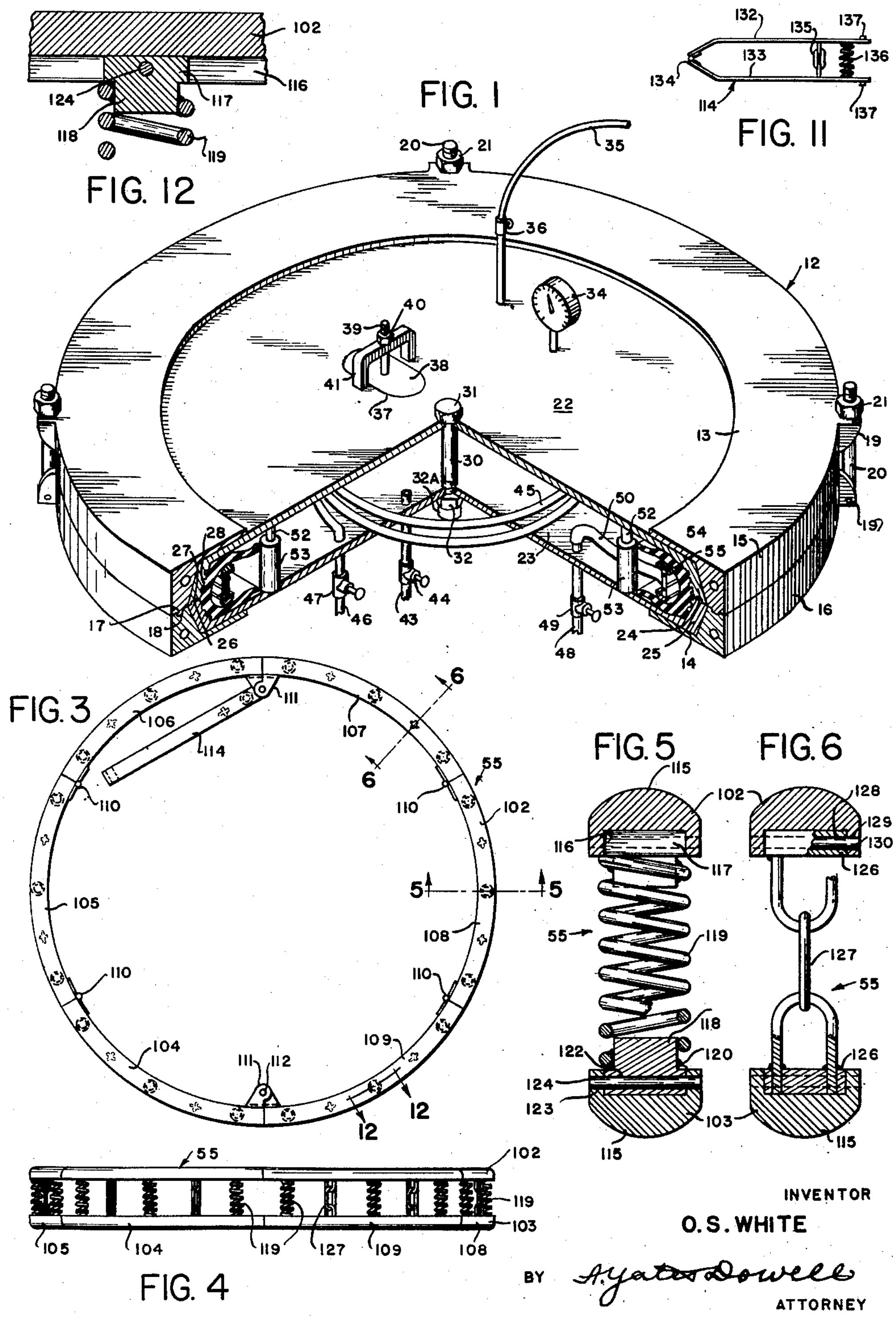
Fig. 1 is a fragmentary perspective illustrating one application of the tire recapping mold.
Figure 2:
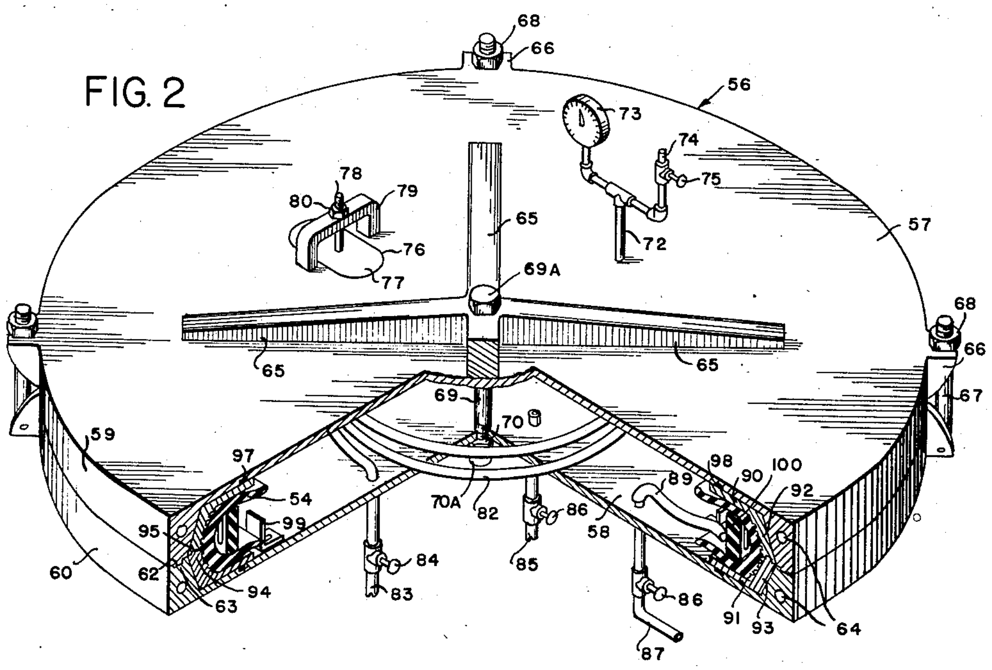
Fig. 2 is a fragmentary perspective illustrating a modified tire recapping mold.
Figure 7:
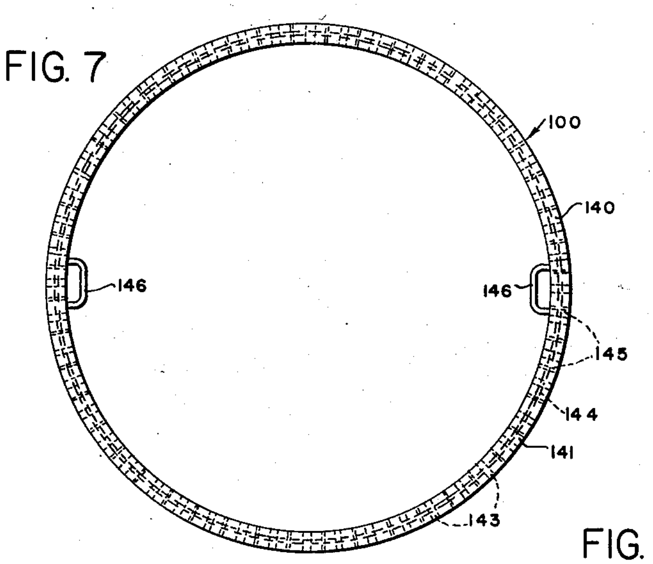
Figure 9:
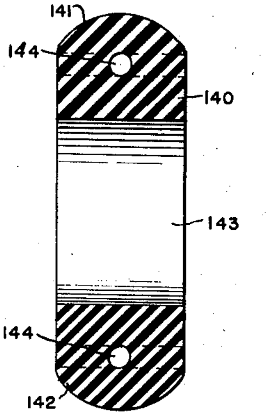
Figure 10:
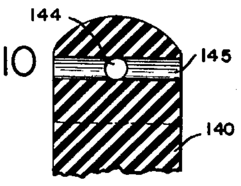
Figure 8:
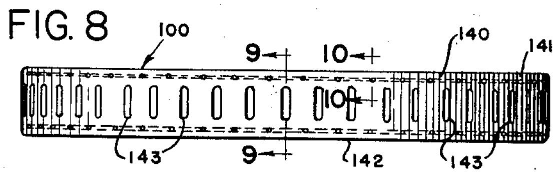
Figures 13, 14, 15, 16, 17, 18, 19, 20, 21:
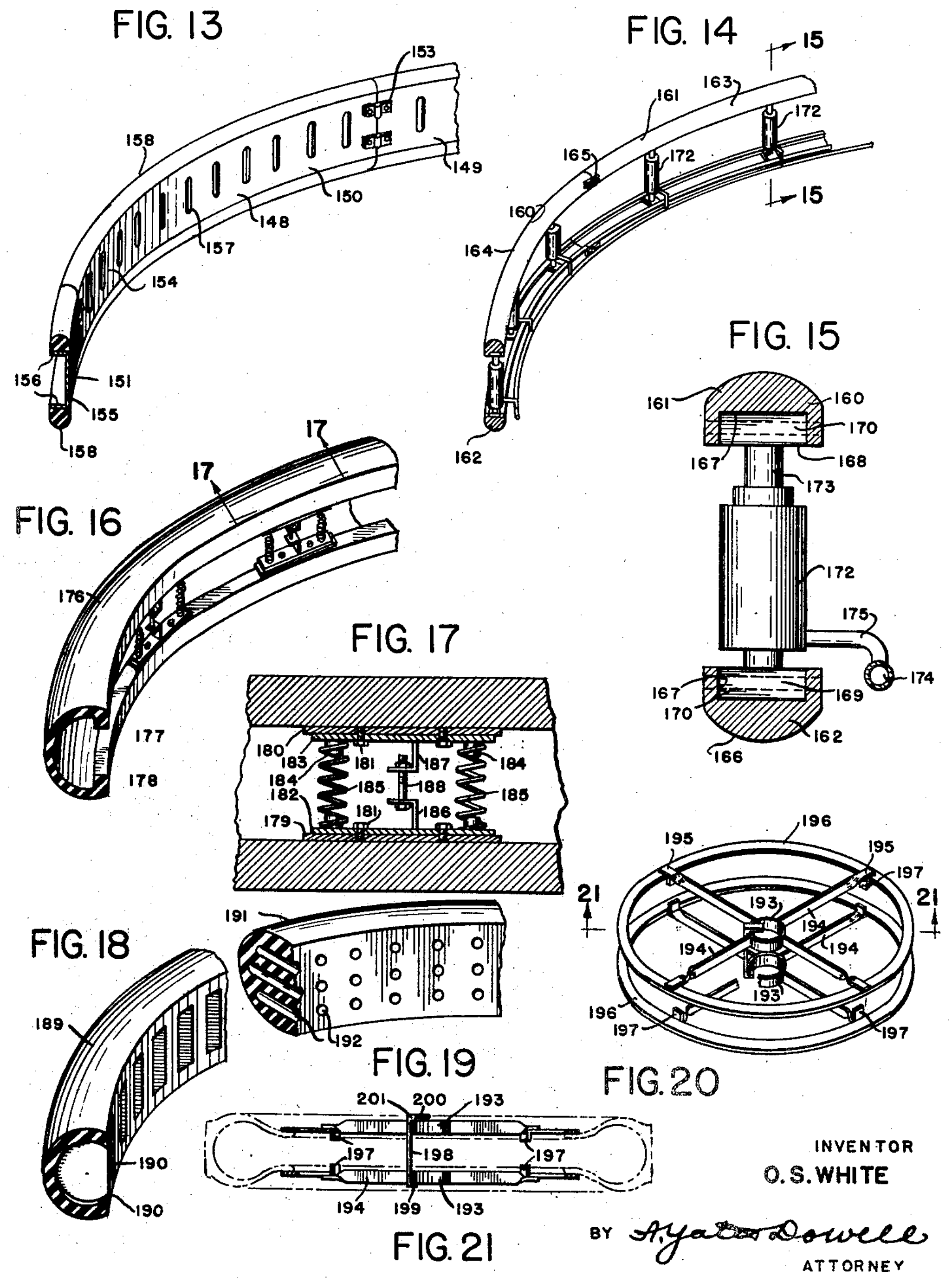
Figure 22:
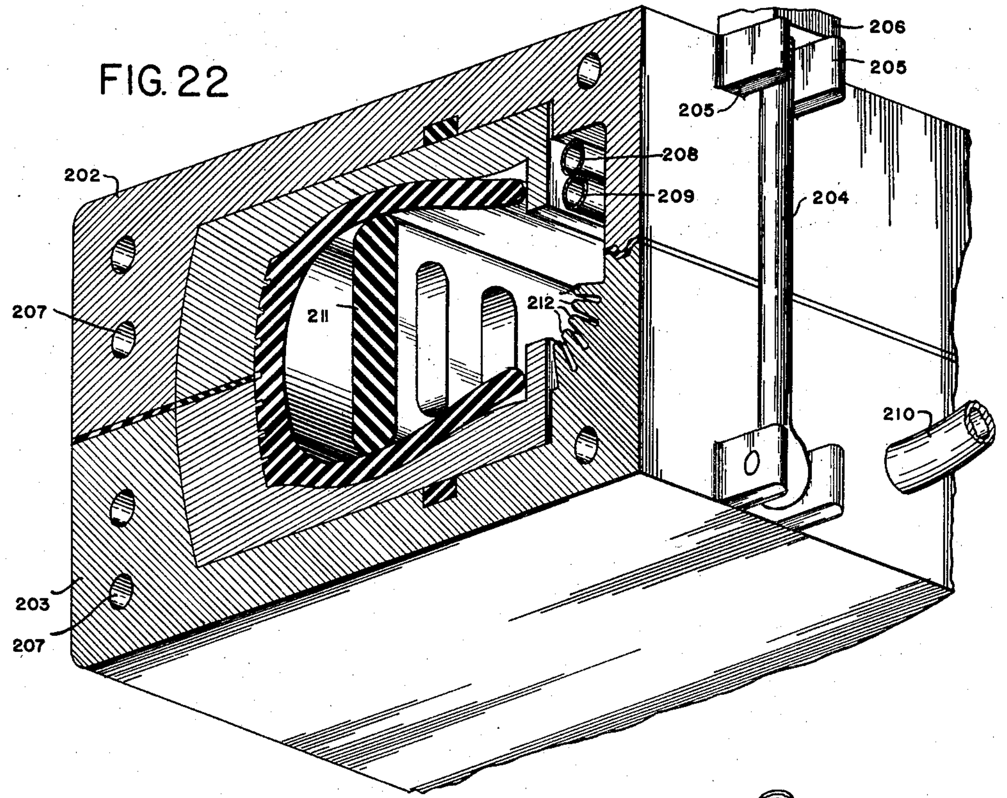
Figure 23:
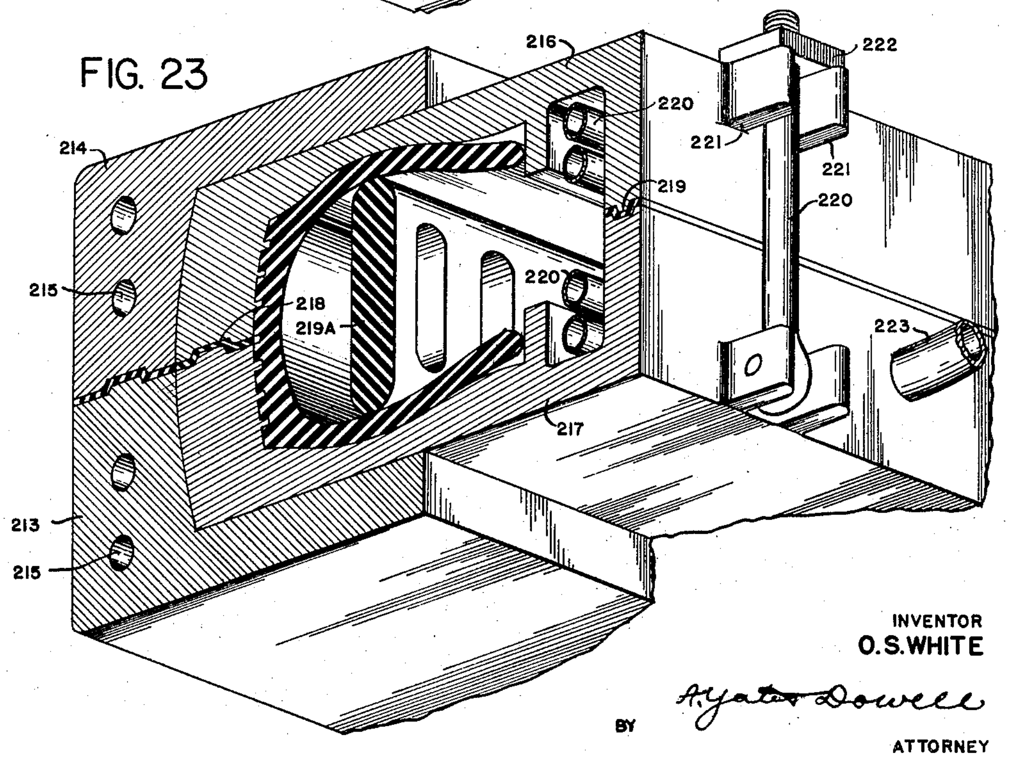

Fig. 3, a plan view of a filler member for use within a tire casing during the retreading process;

Fig. 4, an elevation of the device of Fig. 3;

Fig. 5, a section taken on lines 5—5 of Fig. 3, parts being shown in elevation;

Fig. 6, a section taken on lines 6—6 of Fig. 3, parts being shown in elevation;

Fig. 7, a plan view of a modified filler member;

Fig. 8, an elevation of the filler member of Fig. 7;

Fig. 9, a section taken on lines 9—9 of Fig. 8;

Fig. 10, a section taken on lines 10—10 of Fig. 8;

Fig. 11, an elevation of a connecting device of the filler member of Fig. 3;

Fig. 12, a section taken on lines 12—12 of Fig. 3;

Fig. 13, a fragmentary perspective illustrating another modified filler member;

Fig. 14, a fragmentary perspective illustrating still another modified filler member;

Fig. 15, a section taken on lines 15—15 of Fig. 14;

Fig. 16, a fragmentary perspective of an annular filler member for exerting pressure on the tread portion and lower sidewalls of a tire casing during the recapping process;

Fig. 17, a section taken on lines 17—17 of Fig. 16 showing the details of the springs for urging the sidewalls of the pressure member against the sidewalls of the tire and also means for limiting outward movement;

Fig. 18, a fragmentary perspective of another form of pressure exerting member;

Fig. 19, a still further form of pressure exerting member;

Fig. 20, a perspective of a bead engaging and compressing tool for use with the present invention for urging the beads of the tire together for facilitating the application of the tire in the mold of Figs. 1 and 2;

Fig. 21, a section taken on line 21—21 of Fig. 20, and illustrating a tire in phantom maintained with the heads in compressed condition;

Fig. 22, a fragmentary perspective of another form of tire mold particularly useful for high pressure large sized tires without requiring the large flat plates; and Fig. 23, a fragmentary perspective with parts in section of a further modification similar to that shown in Fig. 22.

Briefly stated, the present invention relates to a tire retreading or recapping mold in which heat can be readily and rapidly applied to the interior surfaces of a casing as well as to the exterior surfaces and in which steam can be applied directly to the interior of a tire casing if so desired. The tread area of the tire casing is forced outwardly into the tread mold surfaces by the pressure within the mold, the mold being so formed as to have a minimum of joints which are susceptible to leakage which would affect the vulcanizing process.

Applicant's invention further comprises resilient filler devices for use within the interior of a tire casing to force the walls of the casing outwardly against the interior walls of the mold thereby producing a seal between the walls of the casing and the interior walls of the mold. These filler devices may, if desired, replace the conventional air bag and allow the use of directly applied steam within the interior of the tire casing and further allow the area of the tire casing in the vicinity of the beads to be free so that the same mold can accommodate a variety of tire sizes.

As illustrated in Fig. 1, a recapping mold 12 is shown which comprises a pair of annular heater members 13 and 14. These annular heater members have inwardly extending flanges 15 and 16 along their outer peripheries with the inner edge of the flange 15 being provided with a tongue 17 which fits into a groove 18 provided in the inner edge of the flange 16. These flanges are provided with steam passages for heating purposes. The annular heaters 13 and 14 are further provided with adjacent pairs of lugs 19. A bolt 20 is pivoted to one of the pairs of lugs 19 and is held by the adjacent pair of lugs 19 by a nut 21.

The mold further comprises a pair of circular plates or disks 22 and 23. Inwardly extending flanges 24 and 25 are provided along the outer periphery of the disks 22 and 23 and have complementary interengaging inner edges, the flange 25 being provided with a tongue 26 and the flange 24 being provided with a groove 27. The interior surfaces of the flanges 24 and 25 are provided with a tire tread mold configuration or matrix 28.

The plate members 22 and 23 are releasably clamped together by a bolt 30 having a head 31. Bolt 30 is threaded at its lower end, said lower threaded end being received in a nut 32 fixed to the plate 23 by welding or the like in fluid tight relation. A tubular cap 32A is secured in fluid tight relation to the lower portion of the nut 32, said cap 32 sealing the nut in fluid tight relation to prevent the passage of fluid through the nut from the interior mold, said tubular cap providing space for the lower end of the bolt 30 to permit tightening to obtain the desired adjustment for taking fluid pressure on the plates 22 and 23. The circular plate 22 is further provided with a pressure gauge 34 and a steam or air blowoff hose 35. The blowoff hose 35 is operated by a valve 36 which communicates with the interior of the mold.

The circular plate 22 is also provided with an access opening 37 which is closed by a closure 38 which has extended flanges or shoulders on its inner side to abut the interior surfaces of the circular plate 22 adjacent the access opening 37. The closure 38 is held in position by a bolt 39 and a nut 40, the bolt 39 passing through an opening in the closure 38 and an opening in a U-shaped bracket 41.

The lower plate 23 is provided with an inlet pipe 43 controlled by a valve 44 which can be utilized for admitting either steam or air to the interior of the mold. A heating coil 45 is mounted intermediate the plates 22 and 23 and connected to a steam line 46. Steam is admitted to the coil 45 by a valve 47. The other end of the heating coil is attached to a condensate drain line (not shown).

Another condensate line 48 operated by the valve 49 is attached through an opening in plate 23 to a flexible hose 50 which can be positioned within the interior of a tire casing during the vulcanizing process to draw off any condensation accumulating from the use of steam in contact with the casing.

Plate 23 is further provided with abutment pins 52 spaced around the interior of the mold for positioning or centering the tire casing during the recapping process. Spacer cylinders 53 can be inserted over the pins 52 to accommodate different size tire casings, the thickness of the cylinders being varied for the different size casings.

Also illustrated in position in Fig. 1 is a tire casing 54 and a tire filler device 55, the structure of which will be later described in relation to Figs. 3 through 6. Briefly, the filler device 55 is inserted within the interior of the tire casing for resiliently pressing the outer walls of the tire casing against the interior walls of the mold during the recapping process. It should be noted that the filler member 55 contacts the interior tire walls at a point approximately centrally between the bead and the tread of the tire casing. During the process the beads of the tire will be free to move so that different thicknesses of tires can be accommodated within the same mold without changes being necessary.

A modified mold 56 is illustrated in Fig. 2 and comprises an upper disk or circular plate 57 and a lower disk or circular plate 58 which have inwardly extending flanges 59 and 60 joined to their peripheries. A tongue 62 is provided along the edge of flange 59 and fits in a groove 63 provided along the edge of the flange 60. Steam passages 64 are also provided in the flanges 59 and 60 for heating purposes during the vulcanizing process.

Reinforcing ribs 65 are formed in both the upper disk 57 and the lower disk 58. The outer flanges 59 and 60 are provided with a plurality of aligned pairs of lugs 66 with one pair of lugs 66 having pivotally attached thereto a bolt 67 which is held between the opposite pair of lugs 66 by a nut 68. The mold 56 is further releasably held in clamped position by a central bolt 69 passing through an opening in the upper disk 57 and having its head 69A at the top and the lower end of the bolt being threadedly received by a nut 70 fixed to the end surface of the lower plate 58 by fluid tight welding or the like. A tubular cap 70A is secured to the lower surface of the nut 70 to provide space for the reception of the lower end of the bolt 69 and also to prevent the passage of fluid through the nut from the interior of the mold to the outside. The cap 70A is designed similar to a pipe cap and provides a fluid tight seal so that fluid cannot pass through the space between the threads of the bolt 69 and the nut 70.

The disk 57 is further provided with a pipe 72 supporting a pressure gauge 73 and a relief or blow-off outlet 74 operated by a valve 75. An access opening 76 closed by a closure 77 is formed in the top of the disk 57. The closure 77 is similar to the earlier described closure 38 of Fig. 1 and has inner extended shoulders fitting against interior surfaces of the disk 57 in the vicinity of the access opening 76 and is held in position by a bolt 78 passing through holes in the closure 77 and a U-shaped bracket 79 and cooperating nut 80.

A heating coil 82 is mounted on the interior surfaces of the lower disk 58 and is connected at one end to a steam pipe 83 through a valve 84. The other end of the heating coil 82 is connected to a condensate drain (not shown). A furtther pipe 85 operated from a valve 86 is fixed to extend through the lower disk 58 for admitting steam or air directly into the mold during the vulcanizing process. A condensate drain 87 operated by a valve 88 extends through the lower disk 58 and carries a flexible conduit or hose 89 on its inlet end adapted to be positioned within the interior of a tire casing to remove any condensed moisture during the vulcanization operation.

Tire tread members or matrices are supported within the flanges 59 and 60 of the mold 56 and comprise an upper annular member 90 and a lower annular member 91 which carry inwardly extending flanges 92 and 93 along their outer peripheries. A tongue 94 is fixed to the edge of the flange 93 and fits in a groove 95 positioned in the edge of the flange 92. The interior surfaces of the flanges 92 and 93 carry tire tread mold configurations thereon for forming the threads of a tire casing 54 during the molding process. Annular grooves 97 are formed on the interior sides of the disk 57 and 58 adjacent to the annular members 90 and 91 and enclose resilient packing material 98 for forming an air and steam tight seal between the annular members 90 and 91 and the disks 57 and 58. Abutment brackets 99 are positioned around the interior surface of the disk 58 for aligning the tire casing during the vulcanization process.

Also illustrated in Fig. 2 is a tire casing filler device 100 for use in holding the sides of the tire casing tightly against the interior surfaces of the annular members 90 and 91. The details of the tire casing filler device 100 will be further described in relation to Figs. 7 through 10. However, it should be noted that the tire filler device 55 shown in Fig. 1 can be substituted in the mold of Fig. 2 for the filler device 100 and that the filler device 100 can be substituted for the filler device 55 in the mold of Fig. 1.

The resilient tire casing filler device 55 is illustrated in Figs. 3 through 6, 11 and 12 and comprises an upper annular ring 102 and a lower annular ring 103 each being formed of a plurality of segments 104, 105, 106, 107, 108 and 109. The segments 104, 105 and 106 are joined by hinges 110 to form a semi-circular section, the segments 107, 108 and 109 being also joined by hinges 110 to form an adjacent semi-circular section. The adjacent ends of the segments 106, 107 and 104 and 109 are formed with overlapping apertured plates 111 adapted to be joined when in position within a tire casing. As illustrated in Fig. 3, one pair of the plates 111 are joined by a headed pin 112 whereas the opposite pair of apertured plates 111 are joined by a resilient connecting tool 114, the structure of which will be later described in relation to Fig. 11.

As illustrated in Figs. 4 through 6, the outer surfaces of the annular rings 102, 103 are smoothly rounded at 115 for contact with the interior walls of a tire casing without producing damage to the same. The surfaces 115 may have a rubber pad vulcanized thereto in some instances. The interior surfaces of the annular rings 102, 103 are formed with concentric grooves 116 for holding a plurality of square blocks 117 which carry on their outer surfaces projections 118. The blocks 117 and projections 118 on the adjacent rings 102, 103 are aligned with each other to support a coil spring 119 therebetween. The coil spring 119 is preferably attached by welding 120 or other means to the blocks 117.

Holes 122 are formed transversely of the blocks 117 and adapted to be aligned with corresponding holes 123 for holding a pin 124 to keep the blocks 117 in position.

As seen in Fig. 4, the coil springs 119 are substantially evenly spaced around the peripheries of the rings 102 and 103. Intermediate adjacent coil springs 119, pairs of blocks 126 are positioned which are joined together by a flexible chain 127. These blocks 127 are also provided with transverse holes 128 which are adapted to be aligned with corresponding holes 127 within the rings 102 and 103. A pin 130 extends through the aligned holes 128, 129 to hold the blocks 126 in position.

The resilient connecting device 114 illustrated in Fig. 11, comprises a pair of elongated bars 132 and 133 joined at one end by a hinge 134 and connected at the other end by a chain 135 and a coil spring 136. The open ends of the bars 132, 133 further carry outwardly extended trunnions 137. These trunnions 137 are adapted to be inserted within the apertures of the plates 111 to hold the adjacent segments 106 and 107 of the filler member 55 together within the tire casing, the connecting device 114 being compressed prior to its insertion into position and then released thereby forcing the trunnions 137 into place.

A modified tire filler device 100 is illustrated in Figs. 7 through 10 and comprises an annular ring 140 made of hard material having a relatively high degree of elasticity such as hard rubber. The upper edge 141 and lower edge 142 of the ring 140 are smoothly rounded to adapt them for engagement with the inner walls of a tire casing without harming such casing. A series of elongated slots 143 are positioned about the ring 140 to allow steam to pass freely between the inner and outer walls of the filler device 100.

Concentric steam passages 144 are positioned adjacent the upper and lower surfaces 141, 142 of the annular ring 140 for conveying steam close to these surfaces thereby providing a means of rapidly bringing the adjacent tire casing surfaces up to vulcanizing temperature.

A plurality of transverse passages 145 extend between the interior and exterior surfaces of the annular ring 140 and intercept the concentric steam passages 144 to allow the steam to freely flow into and out of such concentric passages 144.

Handles 146 are provided through the interior surfaces of the annular ring 140 for convenience of positioning and handling during the vulcanization process.

A further modification of a filler member is illustrated in Fig. 13 and comprises an annular member 148 of a plurality of segments, only the segments 149, 150 and 151 being illustrated in Fig. 13, connected to each other by hinges 153 and having intermediate or central channel members 154 consisting of a web 155 and outer flanges 156 extended therefrom. The web 155 is perforated forming a plurality of elongated apertures 157 through which steam may freely pass during the vulcanization process. Pads 158 are attached to the outer surfaces of the flanges 156 and are smoothly rounded on their outer surfaces adapting them for contact with the interior walls of the tire casing without damage thereto. These pads may be made from rubber or other suitable material.

Still another modification of a filler device adapted to be used with the molds of Figs. 1 and 2 is illustrated in Figs. 14 and 15. This filler device comprises an annular member 160 having an upper member 161 and a lower member 162. The annular member 160 further consists of a plurality of hinged segments, only two of the segments 163 and 164 being illustrated in Fig. 14.

The segments 163 and 164 are joined together by hinges 165 similar to the segments of the filler member illustrated in Fig. 3. The outer surfaces of the upper member 161 and lower member 162 are smoothly rounded at 166 for contact with the inner walls of a tire casing and like the filler member of Fig. 3 may be covered with rubber or other suitable material.

On the interior surfaces of the annular members 161, 162 channels 167 are formed into which a plurality of individual blocks 168 and 169. The blocks 168 and 169 are held in position by pins 170 similar to the blocks of 117 of Fig. 5.

Cylinders 172 are attached to the lower blocks 169 and have pistons therein connected to piston rods 173 which are connected at their outer ends to the upper blocks 168. A fluid line 174 is connected by individual conduits 175 to the individual cylinders 172. Fluids such as air or oil may be placed under pressure within the line 174 for actuating the pistons within the cylinders 172 and biasing the upper annular ring 161 away from the lower annular ring 162.

Another form of filler device shown in Figs. 16 and 17 includes a unitary annular channel 176 of C-shape cross section made of resilient material such as rubber and adapted to be received within a tire in a manner similar to that previously described with respect to other filler devices. The flanges 177 and 178 of the filler are pressed apart by spring devices including attaching plates 179 and 180 affixed to the edges of the flanges 178 and 177 respectively by vulcanization or the like. The plates 179 and 180 are provided with threaded apertures therein receiving attaching bolts 181 passing through spring retaining plates 182, 183 for securing said spring retaining plates in fixed position. The spring retaining plates 182 and 183 are provided with upstanding studs or lugs 184 receiving the ends of compression springs 185 which compression springs urge the flanges 177 and 178 apart to press the sidewalls of the tires against the mold. To limit the amount of separation of the flanges 177 and 178, L-shaped brackets 186 and 187 are fixed to plates 182 and 183, respectively, and an adjusting bolt 188 passing through the free legs of the L-shaped brackets provides means for limiting the amount of separation of the flanges 177 and 178 thereby providing for initial tensioning of the springs 185 and limiting the expansion thereof for facilitating insertion of filler into a tire.

Another form of filler device for expanding the sidewalls is shown in Fig. 18 and includes annular element 189 formed of preferably resilient material such as rubber, Neoprene or the like and such annular member is provided with a plurality of recess 190 extending from the inner surfaces of the element 189 toward the outer surface thereof to permit the entrance of air pressure or steam into the filler member to urge the tread and the sidewall of the tire against the mold.

Another form of filler device shown in Fig. 19 includes an annular element 191 formed of rubber-like material which has a plurality of apertures 192 extending from the inner surface thereof toward the outer surface to provide for the admission of fluid pressure or heating medium such as air pressure or steam to urge the tire casing against the mold.

The modifications of the filler devices shown in Figs. 16 to 19, inclusive, are particularly useful in recapping tires which have been repaired and which have some irregularity in the tires since the annular elements 176, 189 or 191 can accommodate for such irregularities to provide uniform pressure within the area of contact between recapping material and the tire casing while preventing moisture or liquid from contacting the bonding surface.

To facilitate the insertion of a tire into a mold a bead engaging and compressing tool is provided as shown in Figs. 20 and 21. The tool includes a pair of identical spider-like elements each including an annular boss 193 from which a plurality of radiating arms 194 project, the outer ends of such arms being twisted to provide bead engaging feet 195 which bead engaging feet contact and, if desired, may be fixed to an annular ring 196 to provide for contact with the bead throughout the entire circumference of the tire. Adjacent to but spaced from the outer ends of arms 194 are bead engaging lugs 197 which serve to center the tire on the bead compressing tool. In use, a spider is positioned on each side of a tire with the feet or pads 195 engaging the outer face of the associated tire bead. When the rings 196 are used such rings engage such tire bead and the feet 195 of the spiders engage the beads. The spiders are brought together by any suitable means and are held together by means of a latch device 198 of C shape, the lower leg 199 thereof engaging the lower annular hub 193 while the upper leg 200 is elongated so that it may extend to the approximate center of the annular boss 193, said upper leg including a lug 201 which engages the upper annular boss 193 whereby the latch device 198 serves to maintain the spiders of the bead engaging tool in operative conditions so that the beads are compressed as shown in Fig. 21 for facilitating the insertion of a tire into the mold. After a tire has been inserted into a mold of the type shown in Figs. 1 and 2, the leg 200 underlies the aperture in the top plates 22 or 57, respectively, so that the bolts 30 or 60, respectively, cannot be inserted. However, prior to insertion of the bolt, the workman engages the leg 200 by inserting a long narrow tool such as a screwdriver through the bolt aperture in the upper plate and pushes the leg 200 to the left as seen in Figs. 20 and 21 thereby releasing the lug 201 from the upper annular boss 193, resulting in separation of the spiders and allowing the tire to snugly engage the mold to prevent entrance of fluid between the mold and the exterior of the tire casing as previously explained. The arms 194 of the spider may be moved or offset so as to clear heating coils 45 or 82.

With reference to Fig. 22, mold sections 202, 203 are secured together by means of bolts 204 hinged at one end to mold section 203 and received between lugs 205 in mold section 202, being drawn to tight condition by nuts 206. Passages 207 in the mold sections are supplied with steam by means of a steam supply pipe 208, the condensate being returned by a pipe 209 or other suitable means. Air is supplied to the mold through a connection 210 controlled by a valve in the usual manner and a tire filler device 211 serves to brace the intermediate sidewall portions of the tire firmly against the mold to assure fluid tight contact for facilitating uniformly good results in the recapping of tires. Suitable heating fins 212 may be provided as shown.

Upon reference to Fig. 23, tire mold sections 213 and 214 are provided with steam passages 215 for heating the same and such mold sections receive matrices 216 and 217, respectively, which in turn receive the tire to be recapped, such matrices being provided with tongue and groove joints 218 and 219 which may receive gaskets for obtaining a fluid tight chamber within the matrices. The gasket at 218 may be omitted as the tire sealed against the matrices prevents leakage. A filler device 219A may be used to spread the side walls of the tire firmly against the recapping material. Steam may be provided for heating the tire by means of pipes 220 which are provided with suitable connections. The matrix sections 216 and 217 are secured together by means of bolts 220A hinged to the matrix 217 and adapted to pass between spaced lugs 221 in the matrix section 216, said bolts receiving nuts 222 for drawing the matrices together to obtain a tight joint. Air is supplied to the chamber formed by the matrices by means of air supply 223 controlled in the usual manner.

The filler devices used in this form of the invention may be any of the filler devices previously described and particularly those shown in Figs. 16 to 19, inclusive.

In the recapping process of a tire, the old tread is removed by buffing, after which cement is applied to the tire carcass and new rubber in the form of a strip is applied to the tire. The tire is then placed in a mold for curing and vulcanizing.

The curing temperature is approximately 281 degrees for the rubber to vulcanize to the tire carcass and cure. The new rubber should be brought up to temperature in approximately seven minutes. If the heat is brought up much slower, it has been found that the rubber will semi-cure and be useless.

As it has been found that the temperature must be raised quickly in the process, applicant has devised a method of heating both the inside walls and the outside walls of a tire during the recapping process. It has been found that by applying heat at 281 degrees or less to the inside walls of a tire at the same time heat is being applied to the outside, the curing time for a recapped tire has been reduced to one-third the time ordinarily required.

A further advantage is that the rubber directly in contact with the mold will not overcure. This means that the first $\frac{2}{32}$ inch of the tread will give more mileage.

Thus, it can be seen that applicant has produced a mold in which heat can be readily and rapidly applied to the proper surfaces of a tire casing during the vulcanization process. Further, the heat can be in the form of directly applied steam without producing harm to the tire casing and the conventional tire bag is no longer necessary, the tire casing being forced into the tread mold surfaces by the pressure within the mold. It can be further seen that applicant's mold is designed to have a minimum amount of joints which are susceptible to leakage of the pressure from within the mold.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for retreading tries comprising a pair of substantially solid circular disks having inwardly turned peripheral flanges to provide a tire receiving recess in each disk, one of said disks being adapted for fixed support in a generally horizontal position, the other of said disks being adapted to be removed and to be applied to said first disk, a plurality of bead engaging pins mounted on said first disk for centering a tire thereon, a heating coil mounted on said first disk and located within the outline of said positioning pins, an annular filler for positioning within a tire casing for engaging the side wall portions at substantially the widest portion of the tire carcass for urging such side walls of the tire against the disks, a pair of bead engaging spiders adapted to contact the outer portions of the beads of the tire, means to maintain said spiders in position urging said beads of the tire together to provide for ready insertion of the tire in the mold formed by said disks, means to maintain a fluid tight chamber between the disks and the tread portion of a tire carcass between the widest portion of the tire carcass mounted in said mold formed by said disks and to prevent separation of said disks, means to provide pressure within said mold chamber to press the tread portion of the tire carcass against the peripheral flanges and the peripheral portion of the circular disks to produce effective pressure on a camel back on a tire to be recapped, said annular filler serving to maintain intimate and fluid tight contact between the side walls of the tire being recapped and the mold to fluid tightly seal the peripheral portions of the disks.

2. Tire vulcanizing equipment comprising a pair of disks of substantially the diameter of a tire, tread mold elements mounted adjacent the peripheries and between the disks, said tread mold elements providing camel back engaging mold surfaces for contacting the tread portion to the mid-side wall portions only of a tire carcass, means to mechanically engage the inner surface of the mid-portions only of the side walls and to press the outer surface of such mid portions tightly against the mold elements to provide a fluid tight seal between the mid-portion of the outside surface of the side wall of the carcass and the mold elements to seal the mating peripheries of the tire mold, said means to mechanically engage the inner surfaces of the mid portions only of the side walls being of limited thickness and having openings extending from the inner to the outer surfaces thereof providing a fluid passage from the bead portion of the carcass directly to the inner surface of the tread portion of the carcass, said disks being fluid tight, means for conducting a fluid under suitable pressure and at a suitable temperature can be maintained between the disks and the inner surface of the tire carcass.

3. Tire recapping and vulcanizing equipment comprising a pair of oppositely disposed disk members having cooperating flanges at their peripheries extending toward each other, fastening means releasably holding said disk members in spaced relation, heating means located between said disk members for heating the interior of the mold, tire centering projections mounted on said disk members for contacting the bead portions only in limited areas for accurately centering the tire, a relatively thin tire casing filler of a width to engage the interior of the tire carcass at the region of greatest width of the tire for forcing the mid portions of the side walls of the tire casing outwardly into contact with the mold, said filler having passages through its thickness for the free movement of heat and pressure fluids from the space between said disks, said structure avoiding pressure contact of the bead portions of the tire with the walls of the mold and permitting direct application of fluid pressure and heat into contact with the inner surface of the tread portion of the carcass whereby rapid heating is accomplished.

4. Tire recapping and vulcanizing equipment comprising a pair of oppositely disposed tires receiving members having cooperating flanges at their outer peripheries extending toward each other, said tire receiving members providing a mold, fastening means releasably holding said tire receiving members in tire vulcanizing relation, heating means located between said tire receiving members for heating the interior of the mold, said tire receiving members providing a closed chamber completely encompassing the tire and providing for fluid pressure between said tire receiving members, means for conducting fluid under suitable pressure and at a suitable temperature in the chamber between said tire receiving members and the inner surface of the tire carcass, tire centering projection means mounted on said tire receiving members for contacting the bead portions for accurately centering the tire in the mold, a relatively thin tire casing filler of a width to engage the interior of the tire carcass at the region of greatest width of the tire for forcing the mid portions of the side walls of the tire casing outwardly into contact with the mold, said filler having passages through its thickness for the free movement of heat and pressure fluids from the space between said tire receiving members, said structure avoiding pressure contact of the bead portions of the tire with the walls of the mold and permitting direct application of fluid pressure and heat into contact with the inner surface of the tread portion of the carcass whereby rapid heating is accomplished.

References Cited in the file of this patent

UNITED STATES PATENTS

| | | |
|---|---|---|
| 1,362,169 | Macbeth | Dec. 14, 1920 |
| 1,380,426 | Seward | June 7, 1921 |
| 1,389,442 | De Mattia | Aug. 30, 1921 |
| 1,652,019 | Laursen | Dec. 6, 1927 |
| 1,757,376 | Laursen | May 6, 1930 |
| 1,879,348 | Lawson | Sept. 27, 1932 |
| 1,890,133 | Shoemaker | Dec. 6, 1932 |
| 2,561,573 | Hovlid et al. | July 24, 1951 |
| 2,571,258 | Kolins | Oct. 16, 1951 |
| 2,585,628 | Crane | Feb. 12, 1952 |
| 2,595,258 | Hildred | May 6, 1952 |
| 2,659,104 | Glynn | Nov. 17, 1953 |
| 2,728,945 | Clapp | Jan. 3, 1956 |
| 2,730,764 | James | Jan. 17, 1956 |
| 2,745,137 | Glynn | May 15, 1956 |
| 2,791,805 | White | May 14, 1957 |